United States Patent
Baker

(10) Patent No.: US 11,748,484 B2
(45) Date of Patent: Sep. 5, 2023

(54) TRI-LEVEL SECURE SEPARATION KERNEL

(71) Applicant: Wind River Systems, Inc., Alameda, CA (US)

(72) Inventor: Arlen Baker, Scottsdale, AZ (US)

(73) Assignee: WIND RIVER SYSTEMS, INC., Alameda, CA (US)

( * ) Notice: Subject to any disclaimer, the term of this patent is extended or adjusted under 35 U.S.C. 154(b) by 776 days.

(21) Appl. No.: 16/747,789

(22) Filed: Jan. 21, 2020

(65) Prior Publication Data

US 2021/0224392 A1 Jul. 22, 2021

(51) Int. Cl.
*G06F 21/57* (2013.01)
*G06F 9/455* (2018.01)

(52) U.S. Cl.
CPC ........ *G06F 21/575* (2013.01); *G06F 9/45558* (2013.01); *G06F 2009/45587* (2013.01); *G06F 2221/034* (2013.01)

(58) Field of Classification Search
CPC ...... G06F 21/575; G06F 21/53; G06F 9/4558; G06F 2009/45587; G06F 2221/034
See application file for complete search history.

(56) References Cited

U.S. PATENT DOCUMENTS

| 2012/0066509 A1* | 3/2012 | Lapp | G06F 21/6218 |
| | | | 713/189 |
| 2016/0070658 A1* | 3/2016 | Woolley | G06F 9/547 |
| | | | 711/130 |
| 2016/0364341 A1* | 12/2016 | Banginwar | G06F 9/45558 |

OTHER PUBLICATIONS

Parkinson, Paul. (2015). Multicore MILS—Evolution of the multiple independent levels of security software architecture to enable multi-level secure multicore systems. 10 Pages.*

* cited by examiner

*Primary Examiner* — Matthew T Henning
(74) *Attorney, Agent, or Firm* — Fay Kaplun & Marcin, LLP

(57) ABSTRACT

A high assurance kernel executed by a safety certified hypervised system using a separation kernel. The high assurance kernel includes a first level of the separation kernel configured to perform first security features associated with a hypervisor, the first level configured to run on a primary core and a second level of the separation kernel configured to augment the first security features with second security features, the second level implemented on a separate protected component from the primary core, the first level and the second level communicating with one another through a physical separation between the first and second levels. The high assurance kernel may further include a third level of the separation kernel configured as a virtual machine to perform third security features associated with the hypervisor.

20 Claims, 1 Drawing Sheet

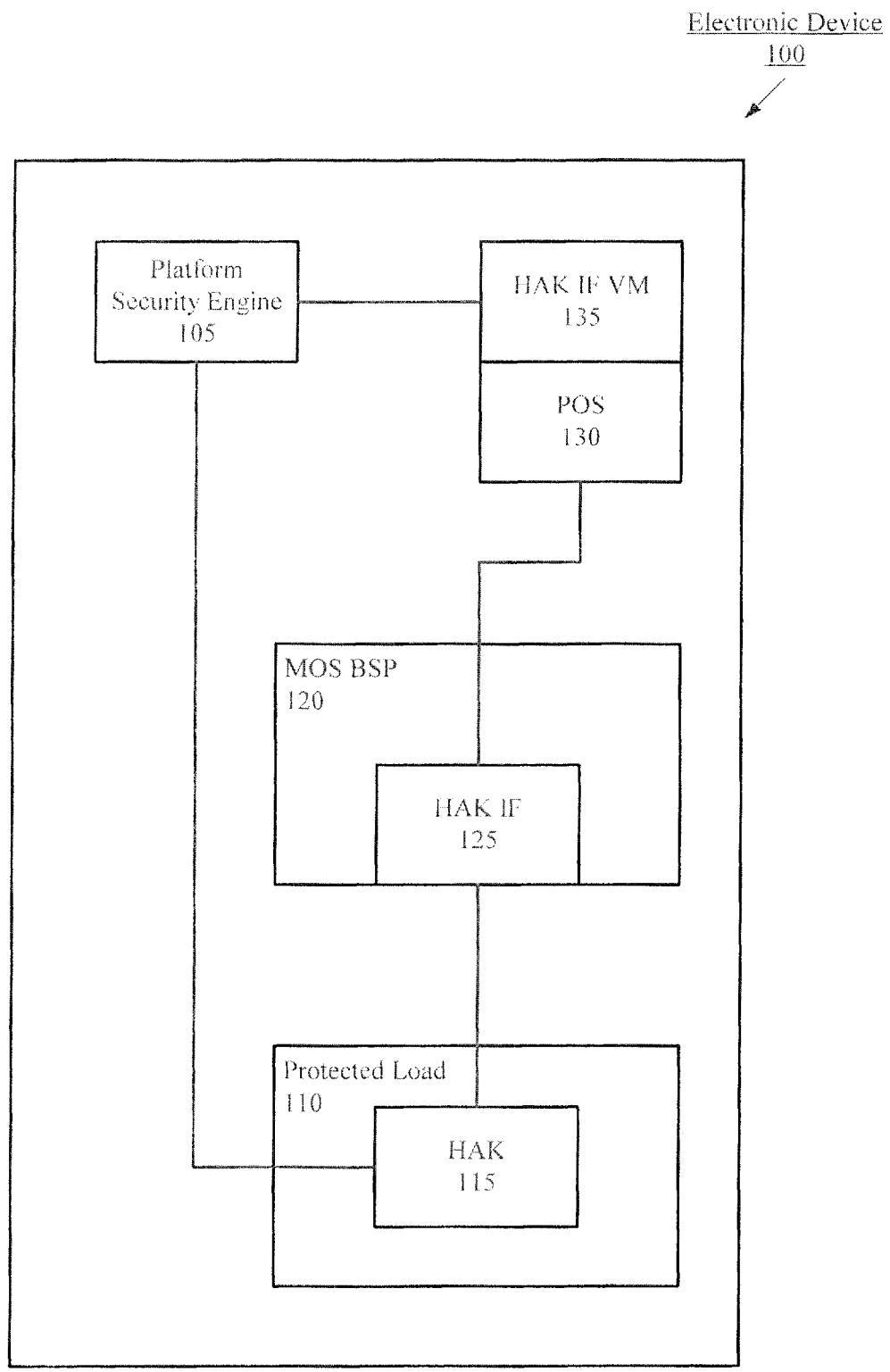

TRI-LEVEL SECURE SEPARATION KERNEL

BACKGROUND INFORMATION

An electronic device may include a processor that executes an operating system. The core of the operating system may be a computer program executed as a kernel that is configured to control operations of the device (e.g., software threads, hardware requests, etc.). A specific type of kernel used in security applications is a separation kernel. The separation kernel may be in a single hypervisor instance or in a configuration that includes the hypervisor and privileged virtual machines that reside above the same hypervisor. When implemented with a safety-certified hypervisor having security-related functions in a virtual machine, the separation kernel may provide multilevel security operations where operations may be performed as if by separate, isolated virtual machines. However, certain critical security features may be provided by the hypervisor that reduces an overall security rating of the separation kernel.

SUMMARY

In some exemplary embodiments, a high assurance kernel is executed by a safety certified hypervised system using a separation kernel. The high assurance kernel includes a first level of the separation kernel configured to perform first security features associated with a hypervisor, the first level configured to run on a primary core and a second level of the separation kernel configured to augment the first security features with second security features, the second level implemented on a separate protected component from the primary core, the first level and the second level communicating with one another through a physical separation between the first and second levels.

In further exemplary embodiments, the high assurance kernel further includes a third level of the separation kernel configured as a virtual machine to perform third security features associated with the hypervisor.

In other exemplary embodiments, an electronic device having a memory arrangement and a processor is described. The processor is configured to run a safety certified hypervised system using a separation kernel, the separation kernel including a high assurance kernel. The high assurance kernel includes a first level of the separation kernel configured to perform first security features associated with a hypervisor, the first level configured to run on a primary core and a second level of the separation kernel configured to augment the first security features with second security features, the second level implemented on a separate protected component from the primary core, the first level and the second level communicating with one another through a physical separation between the first and second levels.

In still further exemplary embodiments, a high assurance kernel executed by a safety certified hypervised system using a separation kernel is described. The high assurance kernel includes a first level of the separation kernel configured to perform first security features associated with a hypervisor, the first level configured to run on a primary core, a second level of the separation kernel configured to augment the first security features with second security features, the second level implemented on a separate protected component from the primary core, the first level and the second level communicating with one another through a physical separation between the first and second levels and a third level of the separation kernel configured as a virtual machine to perform third security features associated with the hypervisor, the second level and the third level communicating with one another through a further physical separation between the second and third levels.

BRIEF DESCRIPTION OF THE DRAWINGS

FIG. 1 shows an exemplary electronic device including a secure separation kernel according to the exemplary embodiments.

DETAILED DESCRIPTION

The exemplary embodiments may be further understood with reference to the following description and the related appended drawings, wherein like elements are provided with the same reference numerals. The exemplary embodiments are related to a device, a system, and a method for implementing a tri-level separation kernel that augments security-related features of a safety certified hypervisor. In one of the levels, the tri-level separation kernel introduces a component that resides in a protected and isolated space on the platform. As will be described in detail below, the component may be termed a high assurance kernel (HAK) that provides critical security operations to the safety certified hypervisor to increase the security measures used by the hypervisor.

The exemplary embodiments are described with respect to security features that are separated through a separation kernel of a hypervisor. However, the particular implementation in which the security features that are introduced through a separate component (e.g., the HAK) is only exemplary and other implementations as well as other applications may be used within the scope of the exemplary embodiments. For example, a device may utilize software comparable to an operating system that includes a program or operation similar to a kernel where the program may be configured in a manner comparable to a separation kernel. Thus, the exemplary embodiments may represent any implementation in which select security features are separated from other security features in two or more levels.

The exemplary embodiments implement a separation kernel in a single hypervisor instance or in a configuration that includes the hypervisor and a plurality of privileged virtual machines that reside above that same hypervisor where a virtual machine may also be referred to as a partition or a virtual board. The exemplary embodiments provide a HAK that is built around a safety-certified hypervisor where security-related operations that provide security features may be performed in a virtual machine. Through the HAK, the exemplary embodiments may bring critical security features to the platform. For example, the critical security features may include secure information flow control between the virtual machines associated with the hypervisor that includes residual information protection (RIP) to prevent covert storage channels, trusted initialization of the platform, attestation, security audit logging, cryptographic functions, reliable time stamps, etc.

The exemplary embodiments are described with select terminology related to computing, an operating system, a kernel, etc. that one skilled in the art will reasonably understand. However, when a term is used in a modified or different manner, the description herein will provide the appropriate definition for which the exemplary embodiments are directed. For example, the HAK may relate to an assurance that measures a confidence that the security features, practices, procedures, architecture, etc. of the information system (e.g., the hypervised system) accurately mediates and enforces the security policy. The security policy may refer to securing the information system with regard to the assets of the system, the vulnerabilities of the assets, the security features used to protect the assets, etc. The security policy may also include defining security audit log events for each asset.

FIG. 1 shows an exemplary electronic device 100 including a secure separation kernel according to the exemplary embodiments. The electronic device 100 may include a processor that executes an operating system that utilizes kernels such as the separation kernel within a hypervised system environment. The processor may also execute a hypervisor or virtual machine. The electronic device 100 may represent any electronic device such as, for example, a mobile phone, a tablet computer, a smartphone, a phablet, an embedded device, a wearable device, a Cat-M device, a Cat-M1 device, an MTC device, an eMTC device, another type of Internet of Things (IoT) device, a set top box, a smart television, a desktop computer, etc. The separation kernel according to the exemplary embodiments may be performed by any combination of hardware, software, and/or firmware of the electronic device 100 (e.g., via the operating system).

The electronic device 100 may utilize a safety certified hypervised system that implements a two level scheduler. For example, the two levels may be a module operating system (MOS), a safety-certified hypervisor for a virtual machine or a partition operating system (POS) within a virtual machine. In the certified hypervised system, the separation kernel according to the exemplary embodiments may define three levels of security functionality that allocates security features strategically across components.

A hypervisor may be safety-certified when criteria set by a regulatory agency or other certification group are met. For example, the certification may be offered by the National Information Assurance Partnership (NIAP) which is operated by the National Security Agency (NSA) and originated by the NSA and the National Institute of Standards (NISI). The criteria for the certification may be directed to security testing needs for information technology consumers and producers. In one approach to request certification, the hypervised system used by the electronic device 100 may require inclusion of a separation kernel in at least its most basic form.

As illustrated in FIG. 1, the electronic device 100 may utilize the separation kernel in three levels for a platform security engine 105. The platform security engine 105 may represent a security engine that performs security related operations. For example, the platform security engine 105 may be a Trusted Platform Module developed by Intel Corporation headquartered in Santa Clara, Calif., a Layerscape SEC Engine developed by NXP Semiconductors N.V. headquartered in Eindhoven, Netherlands, a Configuration Security Unit developed by ZyXel Communications Corp. headquartered in Hsinchu, Taiwan, etc. The platform security engine 105 may be implemented in any combination of hardware, software, and/or firmware that may, for example, store RSA encryption keys specific to the hypervised system of the electronic device 100.

The three levels of the separation kernel may include a first level directed to safety certified hypervisor operations as provided through conventional hypervisor implementations from a security perspective, a second level directed to the HAK and its corresponding features, and a third level directed to a HAK interface virtual machine. The first level may include a MOS board support package (BSP) 120 and a HAK interface 125. The second level may include a protected load 110 and a HAK 115. The third level may include a POS 130 and a HAK interface virtual machine 135.

In the first level, the MOS BSP 120 may be the mechanism that allows the MOS of the hypervised system to function with the operating system of the electronic device 100. The MOS BSP 120 may utilize a boot loader or boot manager to place the operating system and one or more device drivers into memory. The HAK interface 125 may be an interface that enables the HAK 115 to communicate with the MOS BSP 120.

The first level may perform a plurality of operations related to a safety certified hypervisor. In a first example, the first level may provide resource utilization protection. Resource utilization protection may refer to, for example, the manner in which a memory arrangement (e.g., random access memory (RAM)) is used. With regard to RAM, the resource utilization protection may manage a time and space allocation of memory units. In a second example, the first level may provide access control. Access control may refer to the manner in which the hypervised system manages system calls and restricts these system calls per partition. In a third example, the first level may provide fault isolation. Fault isolation may refer to the manner in which faults are managed by determining the type of fault and where the fault is located. Through fault isolation, the hypervised system may be configured to handle the fault so that a failure in one partition does not bring down the remaining hypervised system. In a fourth example, the first level may provide safety audit logging. As described above, the security policy may include defining security audit logs. The safety audit logging may relate to generation of these logs for safety-specific events that occur in the hypervised system. In a fifth example, the first level may provide safe inter-partition communication messaging. Safe inter-partition communication messaging may relate to utilizing a shared memory between partitions for data to be exchanged.

In the second level, the protected load 110 may be a protected component that houses its own security, even from the other components of the hypervised system. For example, the protected load may be separate from the primary core of multi-core processors of the hypervised system. For example, the protected load 110 may include a personal processor or processing capability that is protected. In an exemplary implementation, the protected load 110 may be an Innovation Engine developed by Intel, a TrustZone utilizing an Advanced Reduced Instruction Set Computing (RISC) Machine (ARM) architecture, etc. By providing the protected load 110, the HAK 115 may be used in a secure manner. The HAK 115 may be the separate component of the separation kernel that performs the operations of the second level in the safety certified environment provided by the protected load 110.

The second level may perform a plurality of operations related to a safety certified hypervisor. In a first example, the second level may provide secure messaging where a message flow between partitions and residual information is protected. For example, the secure messaging may entail controlling secure information flow between the partitions, virtual machines, virtual boards, etc. The secure messaging may include RIP that protects information that has been logically deleted or released and not available to subjects but may still be present within the hypervised system for recovery. The RIP may also prevent covert storage channels that perform unauthorized information flows between subjects (e.g., covert storage channel for data, covert timing channel for events, etc.). In a second example, the second level may provide security audit logging. In a substantially similar manner as the safety audit logging for safety-specific events, the security audit logging may be for security-specific events. In a third example, the second level may provide trusted initialization of the HAK. To trust that the separation kernel including the HAK, the HAK itself must be initiated in a trusted manner. The second level may ensure that the HAK has been launched for subsequent operations to maintain the trusted nature. In a fourth example, the second level may provide attestation. Attestation may refer to a cryptographic process that verifies that the hypervised system is correct and has not been compromised (e.g., in code space, constant space, unallocated memory space, etc.). In a fifth example, the second level may provide cryptographic functions. For example, the attestation operation may utilize a cryptographic function. Thus, the second level may ensure that the cryptographic function is utilized in a trusted manner (e.g., for subsequent decryption purposes). In a sixth example, the second level may provide reliable time stamps. As computing operations entail certain timing requirements, restrictions, etc., a proper time stamp may provide increased security, particularly when a malicious attack altered a time stamp.

In implementing the second level as a separate component that is performed on a trusted and protected processor, the HAK 115 may provide security features to perform corresponding operations such as those described above. The HAK 115 may be implemented in a "pluggable component" approach through incorporation on an existing platform to provide the security features of the second level. For example, functionality comparable to multiple independent levels of security/safety (MILS) may be incorporated into a safety-certified hypervised system through additional security features provided via the HAK 115. In an exemplary implementation, the HAK 115 may be incorporated into the ARM platform space, the Intel platform space, etc. The HAK 115 may also be utilized with a real time operating system (e.g., VxWorks 653 developed by Wind River Systems headquartered in Alameda, Calif.). For example, the HAK 115 may provide the security features of the second level as additional security measures without any modification to the underlying VxWorks 653 product and maintain a baseline safety certification that is provided via the hypervised system.

In the third level, the POS 130 may be the operating system of a partition that is treated as a separate unit by the operating system of the hypervised system. The HAK IF virtual machine 135 may be a virtual machine that performs a further set of security features.

The third level may perform a plurality of operations related to a safety certified hypervisor. In a first example, the third level may provide attestation of the safety certified hypervised system including the HAK 115 and the safety certified hypervisor represented by the first level. As described above, attestation may refer to a cryptographic verification that the hypervised system is correct. The attestation performed by the third level may use various cryptographic functions such as the Secure Hash Algorithm 2 (SHA-2) family including, for example, 256 bits (SHA-256) or 512 bits (SHA-512). In a second example, the third level may provide harvesting of the safety audit log from the safety certified hypervised system. As described above, the first level may generate safety audit logs for safety-specific events. The third level may gather and process the safety audit logs. In a third example, the third level may provide HAK command/response processing. For example, the HAK 115 may be implemented in the second level as a separate component. The HAK 115 may issue commands that may be processed and/or relayed by the first level to the third level. The third level may execute the commands from the HAK 115.

The above description of the exemplary embodiments relates to the separation kernel including three levels where each level provides respective security features. In implementing the separation kernel according to the exemplary embodiments, the second level may be incorporated as an addition to the first level which encompasses conventional safety certified hypervisor operations from a security perspective. In this manner, the second level according to the exemplary embodiments provides further security features on top of the security features that are conventionally provided.

The exemplary embodiments utilize an approach through a physical separation of the communication between the processors on the platform or the modes of operation within the processor. In utilizing this approach, the exemplary embodiments may utilize a protection scheme for the different levels. For example, in the first level, the MOS BSP 120 may be protected by an onboard memory management unit (MMU) function of the processor. In the third level, the HAK interface virtual machine 135 may be protected by the onboard MMU function of the processor and a tightly defined resource definition. In the second level, the HAK 115 may be protected by a specific physical messaging protocol defined by the platform (e.g., TrustZone for ARM, Innovation Engine for Intel, etc.).

The exemplary embodiments incorporate the second level as an addition to the first level. The augmenting functionality of the HAK 115 may provide a completely secure solution by including a secure boot and/or a trusted boot. For example, the secure boot may be a hardware driven authentication mechanism to cryptographically verify one or more images prior to allowing the boot process to proceed. The trusted boot may be a software driven authentication mechanism with hardware assist that completes the boot process. The trusted boot may follow the secure boot and include a digital signature verification and cryptographic decryption.

The exemplary embodiments provide a device, system, and method to implement a separation kernel through an augmentation of security features of a hypervisor. The separation kernel may include three levels where the first level represents the hypervisor, the second level represents a high assurance kernel that provides the augmented security features, and the third level represents a virtual machine that performs additional security features or executes commands for the augmented security features as provided by the second level. The augmented security features of the second level may include secure messaging between partitions, security audit logging, performing a trusted initialization, performing attestation, using trusted cryptographic functions, and generating reliable time stamps.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows platform, a Mac platform and MAC OS, a mobile device having an operating system such as iOS, Android, etc. In a further example, the exemplary embodiments of the above described method may be embodied as a program containing lines of code stored on a non-transitory computer readable storage medium that may be executed on a processor or microprocessor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A high assurance kernel, comprising:
   at a safety certified hypervised system using a separation kernel:
   a first level of the separation kernel configured to perform first security features associated with a hypervisor, the first level configured to run on a primary core; and
   a second level of the separation kernel configured to augment the first security features with second security features by introducing critical security features that measures the first security features associated with the hypervisor and enforces the security policy associated with the hypervisor, the second level being separate from the hypervisor and implemented on a separate protected component from the primary core, the first level and the second level communicating with one another through a physical separation between the first and second levels.

2. The high assurance kernel of claim 1, wherein the first security features comprises a resource utilization protection, an access control, a fault isolation, a safety audit logging, a safe inter-partition communication messaging, or a combination thereof.

3. The high assurance kernel of claim 1, wherein the second security features comprise a secure messaging between partitions of the hypervised system, a security audit logging, a trusted initialization of the high assurance kernel, an attestation, a use of cryptographic functions, a creation of reliable time stamps, or a combination thereof.

4. The high assurance kernel of claim 1, wherein the hypervised system includes a two level scheduler.

5. The high assurance kernel of claim 4, wherein the two level scheduler includes a module operating system for a virtual machine of the hypervised system and a partition operation system for within the virtual machine of the hypervised system.

6. The high assurance kernel of claim 1, further comprising:
   a third level of the separation kernel configured as a virtual machine to perform third security features associated with the hypervisor.

7. The high assurance kernel of claim 6, wherein the third security features comprise an attestation of the hypervised system, a harvesting of logs, a processing for commands and responses from the high assurance kernel.

8. The high assurance kernel of claim 1, wherein the first level is protected by an onboard memory management unit function of the processor executing the hypervised system.

9. The high assurance kernel of claim 1, wherein the second level is protected by a physical messaging protocol defined by a platform on which the hypervised system is running.

10. The high assurance kernel of claim 1, further comprising at least one of a secure boot sequence and a trusted boot sequence.

11. An electronic device, comprising:
    a memory arrangement; and
    a processor configured to run a safety certified hypervised system using a separation kernel, the separation kernel including a high assurance kernel, the high assurance kernel comprising:
    a first level of the separation kernel configured to perform first security features associated with a hypervisor, the first level configured to run on a primary core; and
    a second level of the separation kernel configured to augment the first security features with second security features by introducing critical security features that measures the first security features associated with the hypervisor and enforces the security policy associated with the hypervisor, the second level being separate from the hypervisor and implemented on a separate protected component from the primary core, the first level and the second level communicating with one another through a physical separation between the first and second levels.

12. The electronic device of claim 11, wherein the first security features comprise a resource utilization protection, an access control, a fault isolation, a safety audit logging, a safe inter-partition communication messaging, or a combination thereof.

13. The electronic device of claim 11, wherein the second security features comprise a secure messaging between partitions of the hypervised system, a security audit logging, a trusted initialization of the high assurance kernel, an attestation, a use of cryptographic functions, a creation of reliable time stamps, or a combination thereof.

14. The electronic device of claim 11, wherein the hypervised system includes a two level scheduler.

15. The electronic device of claim 14, wherein the two level scheduler includes a module operating system for a virtual machine of the hypervised system and a partition operation system for within the virtual machine of the hypervised system.

16. The electronic device of claim 11, wherein the high assurance kernel further comprises:
    a third level of the separation kernel configured as a virtual machine to perform third security features associated with the hypervisor.

17. The electronic device of claim 16, wherein the third security features comprise an attestation of the hypervised system, a harvesting of logs, a processing for commands and responses from the high assurance kernel.

18. The electronic device of claim 11, wherein the first level is protected by an onboard memory management unit function of the processor executing the hypervised system.

19. The electronic device of claim 11, wherein the second level is protected by a physical messaging protocol defined by a platform on which the hypervised system is running.

20. A high assurance kernel, comprising:
    at a safety certified hypervised system using a separation kernel:
    a first level of the separation kernel configured to perform first security features associated with a hypervisor, the first level configured to run on a primary core;
    a second level of the separation kernel configured to augment the first security features with second security features by introducing critical security features that measures the first security features associated with the hypervisor and enforces the security policy associated with the hypervisor, the second level being separate from the hypervisor and implemented on a separate protected component from the primary core, the first level and the second level communicating with one another through a physical separation between the first and second levels; and a third level of the separation kernel configured as a virtual machine to perform third security features associated with the hypervisor, the second level and the third level communicating with one another through a further physical separation between the second and third levels.

* * * * *